Figure 2:
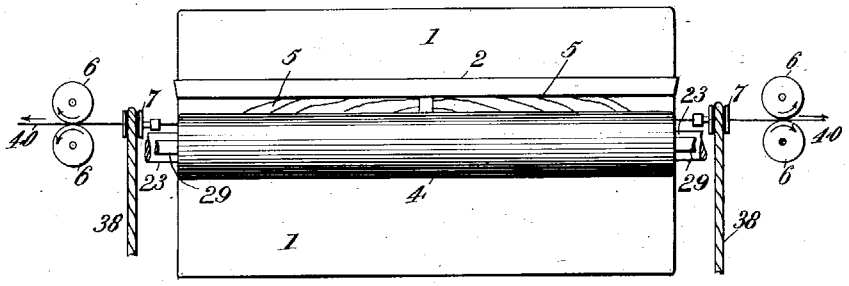

4 Sheets—Sheet 1.

N. CUPERS.

APPARATUS FOR SPINNING FIBROUS MATERIALS.

No. 11,524. Reissued Feb. 25, 1896.

Witnesses:
Edward Tyman
R. T. Laffin

Inventor:
Nicolas Cupers
per Edw. Dummer,
Atty.

N. CUPERS.

APPARATUS FOR SPINNING FIBROUS MATERIALS.

No. 11,524. Reissued Feb. 25, 1896.

Witnesses.
Edward Wyprsair
R. T. Laffin

Inventor:
Nicolas Cupers,
per Edw. Dumner, Atty.

N. CUPERS.

APPARATUS FOR SPINNING FIBROUS MATERIALS.

No. 11,524. Reissued Feb. 25, 1896.

Witnesses.
Edward Wyman
R. T. Laffin

Inventor.
Nicolas Cupers,
per Edw. Dummer, atty.

N. CUPERS.

APPARATUS FOR SPINNING FIBROUS MATERIALS.

No. 11,524. Reissued Feb. 25, 1896.

Witnesses:
Edward Wyman
R. F. Laffin

Inventor:
Nicolas Cupers,
per Edw. Dummer, Atty.

UNITED STATES PATENT OFFICE.

NICOLAS CUPERS, OF WEERT, NETHERLANDS, ASSIGNOR TO WILLIAM H. DRURY, OF WALTHAM, MASSACHUSETTS.

APPARATUS FOR SPINNING FIBROUS MATERIALS.

SPECIFICATION forming part of Reissued Letters Patent No. 11,524, dated February 25, 1896.

Original No. 511,878, dated January 2, 1894. Application for reissue filed December 4, 1895. Serial No. 571,063. Patented in Belgium April 15, 1892, No. 99,060; in France April 19, 1892, No. 221,010, and in Germany July 13, 1892, No. 67,750.

*To all whom it may concern:*

Be it known that I, NICOLAS CUPERS, a subject of the King of Belgium, residing at Weert, in the Province of Limbourg, Netherlands, have invented a certain new and useful Apparatus for Spinning Fibrous Materials, (for which I have obtained Letters Patent in Belgium, No. 99,060, dated April 15, 1892; in Germany, No. 67,750, dated July 13, 1892, and in France, No. 221,010, dated April 19, 1892,) of which the following is a specification, reference being had to the accompanying drawings.

This invention relates to spinning fibrous materials or making yarn or thread from such materials, being especially useful in working materials having a short fiber, such as cotton waste and wool waste, and in producing yarn or thread from materials, such as cow-hair and peat, from which yarn or thread could heretofore have been made to any useful effect only with difficulty or not at all.

In carrying out my invention I operate on the sheet of fibrous material which is the product of carding. By my invention the fibrous sheet is rolled progressively upon itself into a fibrous roll with its axis transverse to the general direction in which the sheet has been carded, and of a diameter suitable with reference to the size of the yarn or thread to be produced. Such roll is revolved bodily about its axis sufficiently to effect the twist required in the yarn or thread. The fibers composing the roll are wrapped spirally and compacted closely during such rolling and revolution, and the roll is drawn endwise of itself continuously, further compressed, evened and stretched to form the desired yarn or thread. In this way the material is wrapped spirally, twisted, rounded and consolidated into yarn or thread at the time of being drawn, and hence, however short the fibers of the material, the yarn or thread has sufficient strength to bear considerable strain upon being drawn out from and endwise of the roll and compressed, evened and stretched, and the material is transformed directly and continuously into twisted and completed yarn or thread.

Figure 3:
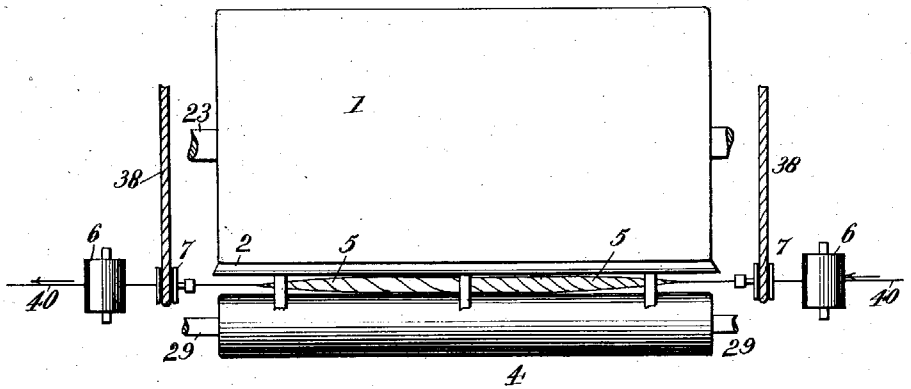
Figure 1:
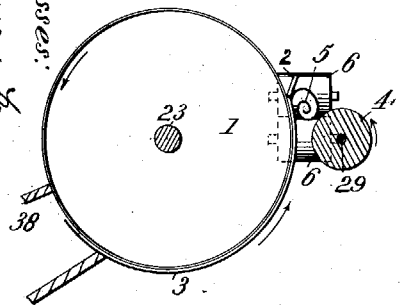
Figure 4:
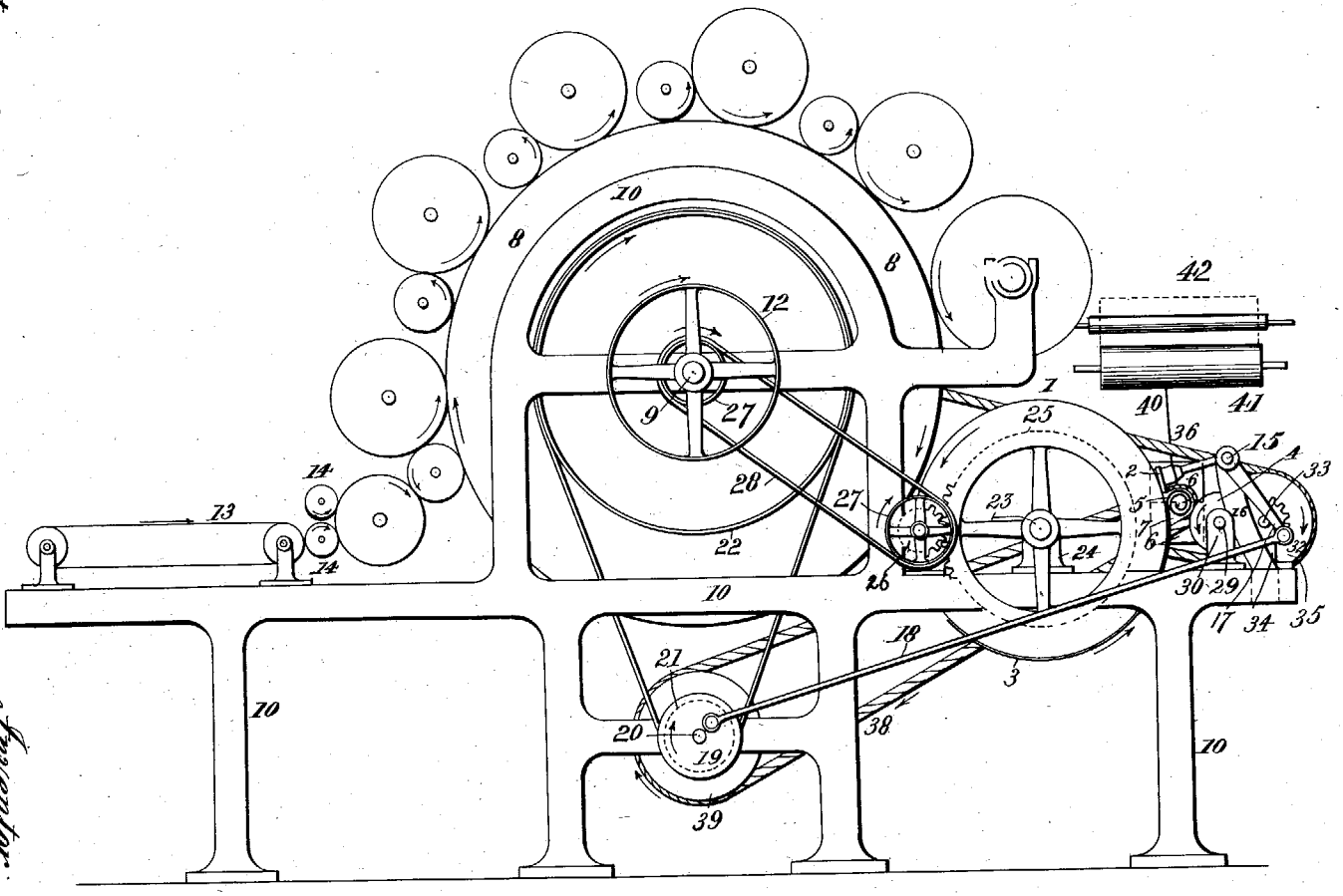
Figure 5:
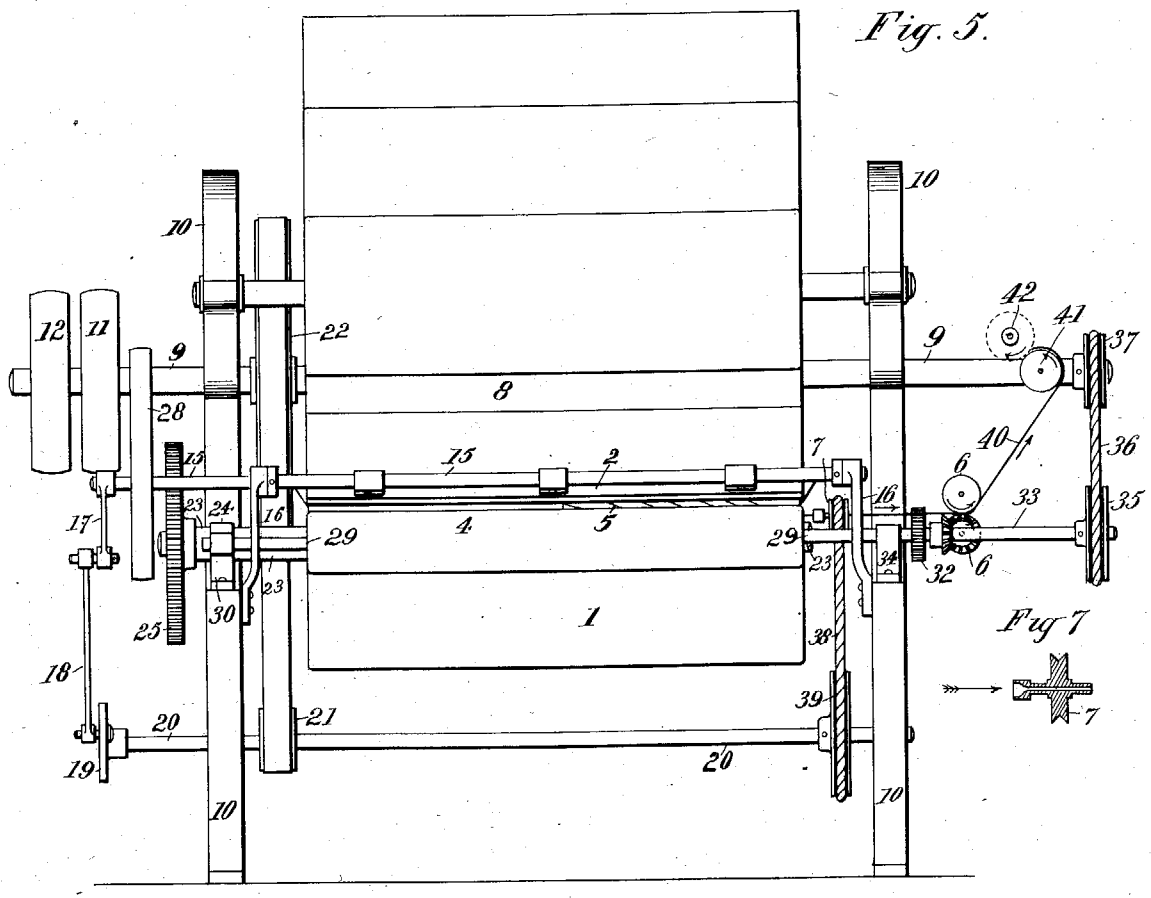

In the drawings, Figures 1, 2 and 3 are respectively a section, an elevation and a plan of devices invented by me for effecting the operations of rolling, revolving, wrapping, compressing, evening, stretching and drawing in accordance with my invention. Fig. 4 is an elevation showing the side of an ordinary wool-carding machine having said devices applied thereto. Fig. 5 is an end view, and Fig. 6 a plan, of the same. Fig. 7 is a section of one of the trumpets.

From the doffing-cylinder 1 the doffing-comb 2 removes the material 3 in the usual manner. The sheet of material detached from the doffing-cylinder by the comb meets a roller 4, which rotates in the same direction as the doffing-cylinder. This roller is located and adjusted in such relation to the doffing cylinder and comb as to co-operate therewith to roll the sheet upon itself into a roll 5 and to compress and compact the fibers thereof together and to assist in revolving said roll bodily about its axis. From each end of this roll and endwise thereof the material is drawn out by a pair of rollers 6 6, after passing through a revolving trumpet 7, having its longitudinal center substantially in the line of the axis of the roll of the material.

By the co-operation of the roller 4, the doffing-cylinder, the doffing-comb and the revolving trumpets, the sheet of material is rolled sufficiently upon itself, and the roll thus formed is sufficiently revolved bodily about its axis between the roller 4 and doffing cylinder and comb, which, during such revolving of the fibrous roll, wrap, compress and compact together the fibers of said roll, as above specified, and reduce and even said roll to the required diameter before its entering the trumpets. By the said revolution of said fibrous roll bodily about its axis by the co-operation of the devices aforesaid, the yarn or thread drawn out from and endwise of said roll is twisted from its hind end (*i. e.*, from its end joined to said roll) to the hardness required for the completed yarn or thread.

The amount of compression of the fibrous roll before it enters the trumpets is determined by the distance of the roller 4 from the doffing cylinder and comb and the rapidity with which the material is drawn through the trumpets. The central opening in each of the trumpets is of such size and shape as to further condense the fibrous roll, to even the same, and, in co-operation with the rollers 6 6, to stretch the same as much as may be necessary to produce the yarn or thread of the desired size. The rollers 6 6 constantly nip and hold the twist of the completed yarn or thread as it is drawn by them through and from said trumpets. From these rollers the yarn or thread may be wound upon spindles of any suitable kind. Thus by this mechanism the sheet of material immediately on being combed from the doffing-cylinder is progressively transformed directly and almost instantly into twisted and completed yarn or thread in one continuous operation, and wound as desired.

Figure 6:
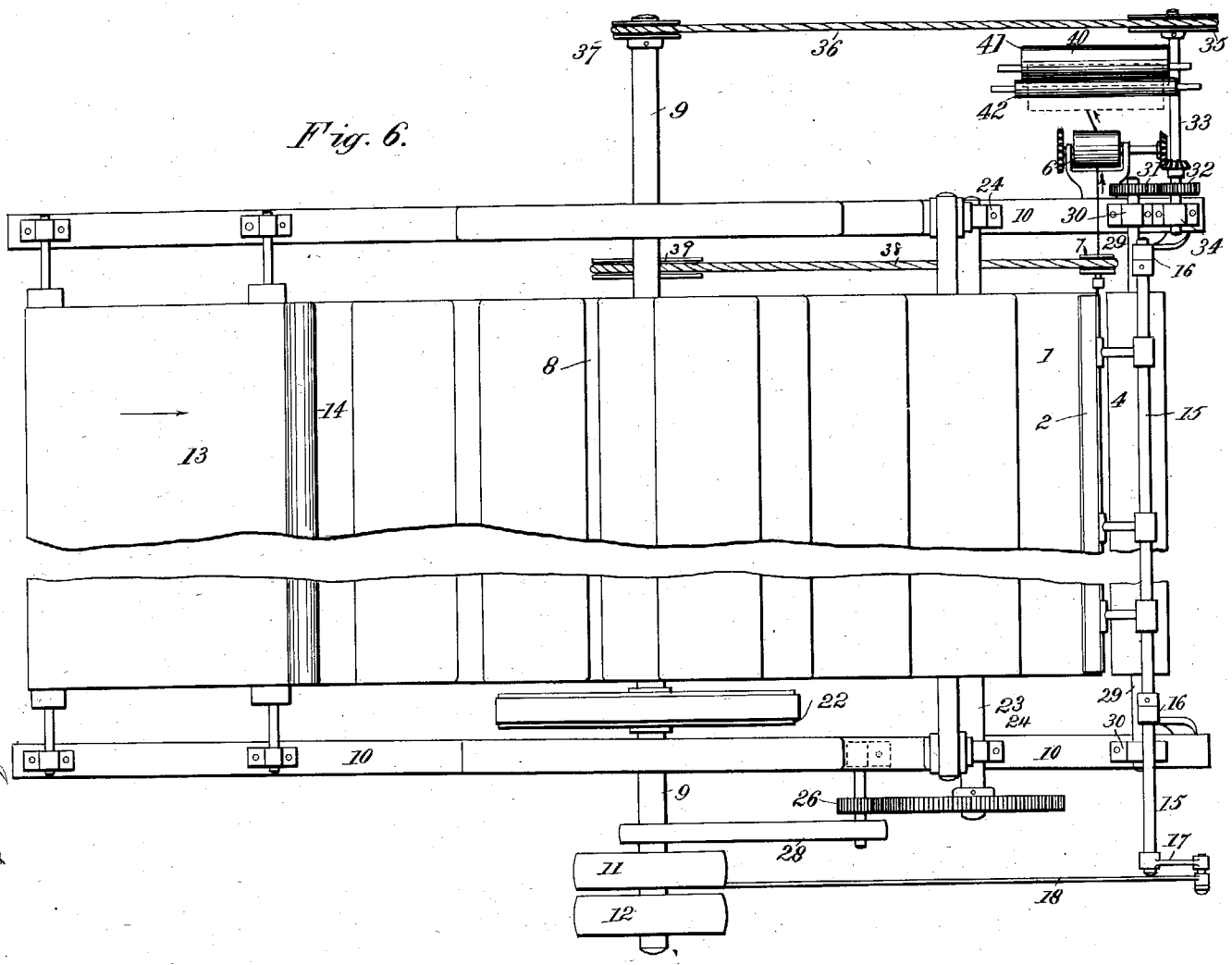

As shown in Figs. 2 and 3, the roll 5 is drawn out from both ends, but it may be drawn out from one end only, as shown in Figs. 4, 5 and 6.

The main cylinder 8 of the carding-machine shown is mounted on a shaft 9 supported by framework 10, and is driven by means of pulley 11.

The feeding-apron 13 is adapted to deliver the material to the feed-rolls 14 14, from which it is taken by the stripping and working rolls to the doffer 1, the sheet of material being detached from the latter by the comb 2, which is attached to the shaft 15 mounted in the bearings 16 16, and receiving an oscillating movement by means of an arm 17, which is attached by a connecting-rod 18 to a disk 19 keyed upon a shaft 20. The shaft 20 receives movement from the driving-shaft 9 by means of a belt which passes around the pulleys 21 22, the former being on the shaft 20 and the latter on the main shaft.

The doffer 1, whose shaft 23 is mounted in the bearings 24 24, receives its movement in the ordinary way by means of the gear-wheels 25 26, driven by the pulleys 27 27 and belt 28.

The roller 4 of my attachment is mounted on a shaft 29 supported by bearings 30 30. This shaft is provided at one end with gear 31, which engages with a gear 32 secured on a shaft 33 mounted in bearings 34, of which only one is shown. The shaft 33 is fitted with a grooved pulley 35 driven by a rope 36 from a pulley 37 on the main shaft 9. The trumpet 7 is mounted on a suitable bearing, (which is not shown,) in which it may revolve and from which it may be readily removed, so that a trumpet having a different size of opening may be substituted adapted for the production of any other desired size of yarn or thread. The trumpet is revolved by means of a rope 38 driven by a pulley 39 on the shaft 20, by means of which shaft and crank thereon the doffing-comb is oscillated.

The crank last named is shown as a disk 19, to a wrist-pin on which is connected one end of a connecting-rod 18, jointed at its other end to radial arm 17 on the shaft 15, on which the comb is mounted. In this way the comb gets its oscillating movement.

Rollers 6 6 serve to draw out the material through the trumpets and are of any ordinary construction. They may be coupled together by gears, and, being suitably mounted, rotated by means of gears and the shaft 33, as will be readily understood and as shown in Figs. 5 and 6.

After having passed from the drawing-rollers 6 6 the yarn or thread is wound upon a horizontal spindle 42, the rotary movement of which is obtained by friction of the spindle or its load against a roller 41 driven by any suitable means, or the winding may be effected by any other suitable devices.

I believe myself to be the first to have made yarn direct from a sheet of carded fibrous material, however that sheet may have been produced, by rolling the sheet upon itself and simultaneously revolving the roll thus formed, compressing it and drawing it endwise of itself into yarn or thread, whereby the yarn or thread drawn from said roll is at the time of being drawn twisted to the desired hardness from its end joined to the body of the roll.

Making yarn or thread directly from the sheet of material, as set forth, is very economical when compared with the ordinary process of spinning, and by my invention it is possible and easy to make yarn or thread suitable for many uses from materials which, I believe, have never before my invention been successfully utilized for that purpose.

I also believe that the product which results from the practice of my invention is distinctively new and useful. For this product I have made application for Letters Patent, Serial No. 573,798, filed December 30, 1895.

I claim as my invention—

1. In machinery for making yarn or thread from fibrous material, the combination with mechanism for rolling upon itself a sheet of carded fibrous material and revolving the fibrous roll thus formed, of mechanism whereby said rotating fibrous roll, as it forms, is continuously drawn endwise of itself into yarn or thread; and means whereby the material as it passes from the body of the fibrous roll to the drawing mechanism is compressed or condensed, substantially as and for the purposes hereinbefore set forth.

2. In machinery for making yarn or thread from fibrous material, the combination with mechanism for rolling upon itself a sheet of carded fibrous material and revolving the fibrous roll thus formed, of mechanism whereby said rotating fibrous roll, as it forms, is continuously drawn endwise of itself into yarn or thread, a condensing trumpet through which the material passes from the body of the fibrous roll to the drawing mechanism, and means for rotating said trumpet in the same direction with the rotating fibrous roll which is being drawn, substantially as and for the purposes hereinbefore set forth.

3. In machinery for making yarn or thread from fibrous material, the combination with the doffing cylinder and comb of a carding-machine, of mechanism to co-operate with said cylinder and comb to collect and compress into a fibrous roll the material combed by said comb from said cylinder and to revolve said fibrous roll, and mechanism whereby said rotating fibrous roll, as it forms, is continuously drawn endwise of itself into yarn or thread, substantially as and for the purposes hereinbefore set forth.

4. In machinery for making yarn or thread from fibrous material, the combination with the doffing cylinder and comb of a carding-machine, of a roller adapted to rotate in the same direction with said cylinder, and adjusted in relation to said cylinder and comb to co-operate therewith to roll between them into a fibrous roll the material combed by said comb from said cylinder, means for rotating said roller, a trumpet to co-operate with said cylinder, comb and roller to revolve said fibrous roll about its axis sufficiently to produce the twist required in the yarn or thread, means for rotating said trumpet, and rollers to co-operate with said trumpet to draw said fibrous roll endwise of itself, all co-operating to transform the material directly from said cylinder into twisted and completed yarn or thread continuously, substantially as set forth.

NICOLAS CUPERS.

Witnesses:
T. E. KING, Jr.,
T. C. CHRISTIANSEN.